T. COOPER.
Refining Iron.
No. 30.
Reissued Mar. 18, 1841.
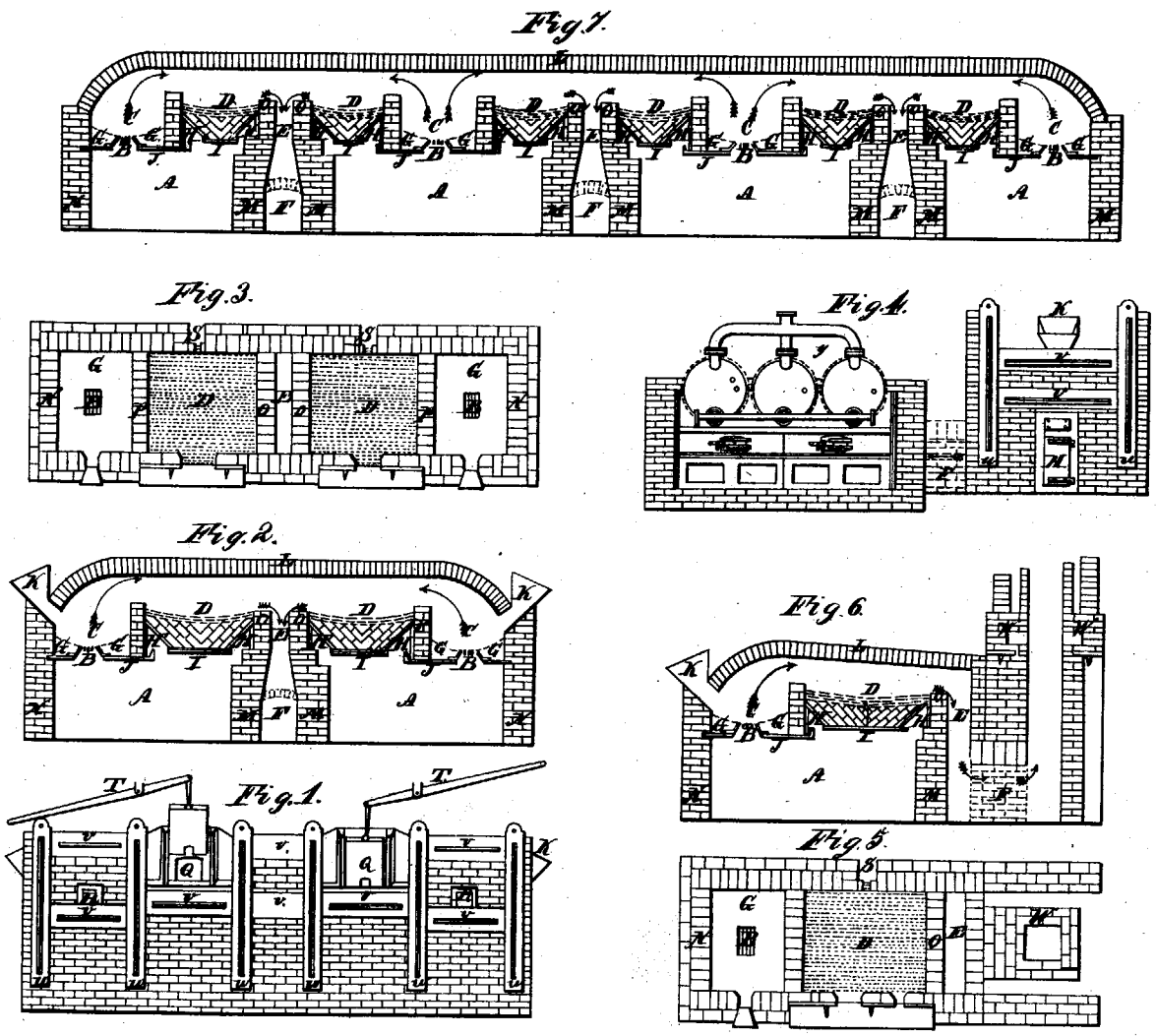
AM. PHOTO-LITHO. CO. N.Y. (OSBORNE'S PROCESS.)

UNITED STATES PATENT OFFICE.

THOMAS COOPER, OF NEW YORK, N. Y.

IMPROVEMENT IN PUDDLING-FURNACES FOR MANUFACTURING IRON WITH ANTHRACITE COAL.

Specification forming part of Letters Patent No. 1,733, dated August 25, 1840; Reissue No. 30, dated March 18, 1841.

*To all whom it may concern:*

Be it known that I, THOMAS COOPER, of the city of New York, in the county and State of New York, have invented certain new and useful improvements upon the reverberatory furnace by means of which the puddling, boiling, scrapping, billeting, and heating of iron and other metals, the smelting of lead and other ores, may be effected solely with anthracite coal, or with a mixture of anthracite and other fuels, with great saving both of the fuel employed and the metal heated, over any other mode now known or in use; and I do hereby declare that the following is a full and exact description thereof.

The nature of my invention consists, first, in providing the reverberatory furnace with a fire-chamber the bottom of which is formed of a small grate, or other means of support to the fuel, that shall freely permit the passage of air through it, surrounded by a hearth or dead-work to protect the masonry of the furnace from the destructive action of the great heat that is generated while the furnace is in operation; the bottom of the fire-chamber when so formed has this further advantage—the clinker is more easily removed from it; secondly, in combining two or more fire-chambers and heating-bottoms or puddling-chambers in one furnace; and, thirdly, in providing this double or combined furnace with a vertically-descending flue when it is used for puddling, scrapping, billeting, or heating iron with anthracite coal.

To enable others skilled in the art to make and use my invention, I will proceed to describe its construction and operation, reference being also made to the drawings hereunto annexed, of vertical and horizontal views and sections of the furnace, laid down upon a scale of one-fourth of an inch to the foot.

I construct a reverberatory furnace of good and substantial masonry, and such parts as are exposed to great heat I make of fire-brick or some material that will resist the action of the heat, the whole being firmly bound together by buckstaffs, clamps, and binders. This furnace may be either single or combined. In either case it comprises or consists of the following divisions, as coal and puddling chambers, ash pit or pits, and flues, with their several parts, as hereinafter described. I would here state that the vertical flue is not absolutely essential when the single furnace only is constructed, though even in this case I believe its use to be attended with much advantage in point of economy. The double furnace, of which Figure 1 is a front elevation, Fig. 2 a vertical and longitudinal section, and Fig. 3 a horizontal plan, will be more particularly referred to in the description. The coal-chambers or chambers of combustion C C have in the center of the floor of each a small grate, B, or other arrangement essentially similar, surrounded by a hearth or dead-work, G, made with ashes or some non-conductor of heat, to protect the side walls from the intense heat that is generated in the center of the mass of coal or that part of it immediately over the grate. A rule for determining the size of the grate cannot be given, since the dimensions are dependent upon the size of the furnace, quality of the fuel employed, and strength of the blasts. The greatest saving both of the fuel and the metal is effected when the grate is contracted to the smallest size at which it will remain efficient.

To support the bottoms of the coal-chambers, and also the fire-bridge walls P P, I place iron plates J J, extending from the front of the rear wall of the furnace, being let into each wall for the depth of from four to six inches. A space is left in these plates for the grate B; or the hearths may be supported by mason-work, either resting on beams let into the walls surrounding the ash-pit or brought up from the foundation, openings being left for the grate, as required in the iron plates. The coal-chambers are supplied with fuel by hoppers K K, and each has a door, R, in front for regulating the fire.

The puddling or heating chambers D D have each a supply-door, Q, in front, raised by a lever, T, and also an opening, S, in the rear to let off the cinder. To form the bottoms of the puddling-chambers, I place angular hollow iron bridges H H, connected with and partially resting upon an iron plate, I, the whole extending from front to rear, and being let into the walls in the same manner as the plates under the coal-chambers.

The ash pits or spaces A A under the coal and puddling chambers receive the ashes and other residuum of the fuel. Into these spaces the air-blast is forced, when it becomes heated before passing into the coal-chamber, and each pit has a door opening to it placed in the end wall, N, of the furnace. This door also serves, by means of a valve placed in it, to supply the coal-chamber with air when the blower is not in operation. The vertical flue E, formed by the flue-bridge walls O O and the external walls of the furnace, descends to a distance below the bottom of the heating-chamber and then leads into a horizontal flue, F, which may pass either under a set of boilers for the purpose of generating steam, or into a chimney-stack placed in the rear opposite the flue. A damper is placed either under the boilers or upon the chimney, that the workmen may graduate the draft to the blast. The furnace is covered with a proper crown, L, and secured by buckstaffs U and iron plates or binders V V.

As further illustrations of my improvements, I have added an end elevation of a furnace, (see Fig. 4,) showing the ash-pit and valve-door X, and the connection of the horizontal flue F, with a set of boilers, Y; a vertical and longitudinal section of a single furnace, (see Fig. 5,) with the flue passing into a chimney-stack, W; a horizontal plan of a single furnace, (see Fig. 6,) and a vertical and longitudinal section of a combination of several chambers, heating-bottoms, and flues, (see Fig. 7,) like parts in all these plans being designated by the same letters of reference.

The furnace before being used should be dried by a moderate heat and rendered perfectly free from moisture. After charging it with coal close the doors of the ash-pit and force into the space A a strong and steady current of air from a rotary fan or other effective blowing apparatus. In the pipe or tube through which the air passes to the furnace from the blowers a throttle-valve should be placed, with a rod extending upward from its axis to the height of the furnace, surmounted by a small arm, by which the workmen may regulate the blast. The air from the blower may enter the ash-pit at any convenient point, care being taken to make the passage sufficiently large to allow the air to pass freely. The cinder should be assisted to flow out at the opening S by placing coals within the recess, secured or kept there by a cross-bar and plate adapted to this use. In other respects the furnace is worked like the ordinary puddling or scrapping furnace.

What I claim as my invention, and desire to secure by Letters Patent, is—

1. Constructing the floor of the fire-chamber with a grate in the center, or other arrangement substantially the same, as set forth, surrounded by a dead-work for protecting the masonry of the chamber and the furnace, all as described.

2. Combining two or more heating-chambers and puddling-chambers with the dead-work and grate, as described, in one furnace.

3. Constructing this combined furnace with a vertically-descending flue, in the manner and for the purpose set forth.

THOS. COOPER.

Witnesses:
WM. A. COX,
DANIEL H. TURNER.